（12） United States Patent
Gallagher et al.

(10) Patent No.: US 11,784,540 B2
(45) Date of Patent: Oct. 10, 2023

(54) ADAPTER FOR CONFIGURING GAS ENGINE REPLACEMENT DEVICE

(71) Applicant: MILWAUKEE ELECTRIC TOOL CORPORATION, Brookfield, WI (US)

(72) Inventors: Patrick D. Gallagher, Oak Creek, WI (US); Timothy J. Bartlett, Waukesha, WI (US); Timothy R. Obermann, Waukesha, WI (US); Alexander Huber, Menomonee Falls, WI (US); William F. Chapman, III, Delavan, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 135 days.

(21) Appl. No.: 17/226,370

(22) Filed: Apr. 9, 2021

(65) Prior Publication Data

US 2021/0320567 A1 Oct. 14, 2021

Related U.S. Application Data

(60) Provisional application No. 63/007,982, filed on Apr. 10, 2020.

(51) Int. Cl.
*H02P 1/54* (2006.01)
*H02K 11/35* (2016.01)
(Continued)

(52) U.S. Cl.
CPC ......... *H02K 11/35* (2016.01); *G06F 3/04847* (2013.01); *H02K 7/116* (2013.01);
(Continued)

(58) Field of Classification Search
CPC .... H02K 11/35; H02K 11/0094; H02K 21/16; G05B 17/02; H02P 9/04
See application file for complete search history.

(56) References Cited

U.S. PATENT DOCUMENTS 5,149,225 A 9/1992 Artzberger
5,387,052 A 2/1995 Artzberger
(Continued)

FOREIGN PATENT DOCUMENTS

CN 205188931 U 4/2016
EP 1331587 A2 7/2003
JP 2016195544 A 11/2016

OTHER PUBLICATIONS

International Search Report and Written Opinion for Application No. PCT/US2021/026549 dated Jul. 21, 2021 (10 pages).

*Primary Examiner* — Karen Masih
(74) *Attorney, Agent, or Firm* — Michael Best & Friedrich LLP

(57) ABSTRACT

One embodiment provides an adapter for configuring device settings of a gas engine replacement device. The adapter includes a transceiver, a user interface, and an electronic processor. The electronic processor is configured to connect the adapter to the gas engine replacement device and generate a graphical user interface showing a plurality of configurable device settings. The electronic processor is also configured to receive user input to choose one or more device settings to configure and receive user input to configure the one or more device setting chosen and generate changed device settings. The electronic processor is also configured to transmit the changed device settings to the gas engine replacement device. The gas engine replacement device is then used to drive power equipment in accordance with the changed device settings.

20 Claims, 9 Drawing Sheets

(51) Int. Cl.
  *H02K 7/116* (2006.01)
  *G06F 3/04847* (2022.01)
  *H02K 11/00* (2016.01)
  *H02K 21/16* (2006.01)
  *H02K 9/22* (2006.01)

(52) U.S. Cl.
  CPC ......... *H02K 9/227* (2021.01); *H02K 11/0094* (2013.01); *H02K 21/16* (2013.01)

(56) References Cited

U.S. PATENT DOCUMENTS

| | | |
|---|---|---|
| 9,154,009 B2 | 10/2015 | Alemu |
| 2005/0029025 A1 | 2/2005 | Medina |
| 2017/0341725 A1 | 11/2017 | Skahan |
| 2018/0138839 A1 | 5/2018 | Puzio et al. |
| 2019/0006980 A1 | 1/2019 | Sheeks et al. |
| 2019/0033831 A1 | 1/2019 | Baumann et al. |
| 2019/0300200 A1* | 10/2019 | Himmelmann ........ B64D 25/00 |
| 2020/0001446 A1 | 1/2020 | Ballard et al. |
| 2020/0076337 A1 | 3/2020 | Abbott et al. |

* cited by examiner

| | | |
|---|---|---|
| ENABLE SPEED CONTROL ALGORITHM A | NO | |
| ENABLE SPEED CONTROL ALGORITHM B | YES | |
| MINIMUM MOTOR SPEED | 1800 RPM | |
| MAXIMUM MOTOR SPEED | 3200 RPM | |
| SPEED LIMIT THRESHOLD | 3300 RPM | |
| PROPORTIONAL COEFFICIENT | 0.9 | |
| INTEGRAL COEFFICIENT | 1 | |
| DIFFERENTIAL COEFFICIENT | 0.5 | |
| OVERCURRENT THRESHOLD | 75A | |
| OVERCURRENT TIMER | 0.010 sec | |
| OVERCURRENT HYSTERESIS | 5A | |
| OVERCURRENT WARNING LIGHT | YES | |
| AUX INPUT A | YES | |
| AUX INPUT B | YES | |
| AUX INPUT C | NO | |
| AUX INPUT D | NO | |
| AUX OUPUT A | YES | |
| AUX OUPUT B | YES | |
| AUX OUPUT C | YES | |
| AUX OUPUT D | YES | |

*FIG. 14A*

| | | |
|---|---|---|
| ENABLE SPEED CONTROL ALGORITHM A | NO | |
| ENABLE SPEED CONTROL ALGORITHM B | YES | |
| MINIMUM MOTOR SPEED | 1900 RPM | |
| MAXIMUM MOTOR SPEED | 3400 RPM | |
| SPEED LIMIT THRESHOLD | 3600 RPM | |
| PROPORTIONAL COEFFICIENT | 0.85 | |
| INTEGRAL COEFFICIENT | 1.1 | |
| DIFFERENTIAL COEFFICIENT | 0.45 | |
| OVERCURRENT THRESHOLD | 75A | |
| OVERCURRENT TIMER | 0.010 sec | |
| OVERCURRENT HYSTERESIS | 7A | |
| OVERCURRENT WARNING LIGHT | YES | |
| AUX INPUT A | YES | |
| AUX INPUT B | YES | |
| AUX INPUT C | NO | |
| AUX INPUT D | NO | |
| AUX OUPUT A | YES | |
| AUX OUPUT B | YES | |
| AUX OUPUT C | YES | |
| AUX OUPUT D | NO | |

*FIG. 14B* ered, on the user interface, a graphical user interface showing a plurality of configurable device settings. The electronic processor is also configured to receive user input, via the

ADAPTER FOR CONFIGURING GAS ENGINE REPLACEMENT DEVICE

RELATED APPLICATIONS

This application claims the benefit of U.S. Provisional Patent Application No. 63/007,982, filed on Apr. 10, 2020, the entire contents of which is hereby incorporated by reference.

FIELD

The present application relates to adapters for gas engine replacement devices and, more particularly, to adapters for configuring original equipment manufacturer settings for gas engine replacement devices.

BACKGROUND

Outdoor power equipment (e.g., lawn and garden equipment) and construction equipment (e.g., concrete mixers, plate compactors), commonly referred to as power equipment, may include a gas engine to run the equipment.

SUMMARY

Gas engines produce harmful emissions, are loud, and are not readily configurable for particular applications of various types of equipment. Gas engines that are designed as general purpose engines that can be plugged into power equipment are not optimized for particular applications, which results in inefficiencies. Customizing engines to adapt to different applications and types of equipment is difficult and expensive, and generally must occur at manufacturing. For example, because configuring a gas engine includes controlling fuel input, speed reduction/increase using gear shifts, etc., additional mechanical parts and controls are needed to configure gas engines to particular adaptations.

Gas engine replacement devices that use, for example, Lithium-ion battery packs and electric brushless motors, provide several advantages over gas engines. The gas engine replacement device is portable, does not produce emissions, and includes easily configurable settings for operation of the electric motors. Electric motors include a wide range of outputs (e.g., 0 to 2760 Watts) and speeds. The output may be controlled by controlling the current flow, duty cycle, and the like. A controller is provided in the gas engine replacement device to control the motor and output of the gas engine replacement device. The settings for operation of the gas engine replacement device are stored in a memory that is accessed by the controller for operation of the gas engine replacement device. The settings are stored, for example, in a firmware application in the memory. These settings may be updated through a user input to configure the gas engine replacement device for particular applications of power equipment.

Some embodiments provide an adapter for configuring device settings of a gas engine replacement device. The adapter includes a transceiver for communication with the gas engine replacement device, a user interface for displaying information and receiving input from a user, and an electronic processor coupled to the transceiver and the user interface. The electronic processor is configured to connect the adapter to the gas engine replacement device and generate, on the user interface, a graphical user interface showing a plurality of configurable device settings. The electronic processor is also configured to receive user input, via the user interface, to choose one or more device settings to configure and receive user input, via the user interface, to configure the one or more device setting chosen and generate changed device settings. The electronic processor is also configured to transmit the changed device settings to the gas engine replacement device. The gas engine replacement device is then used to drive power equipment in accordance with the changed device settings.

In some aspects, the adapter includes a first connection port configured to be connected with a second connection port of the gas engine replacement device.

In some aspects, the adapter includes a housing and a display integrated into the housing. The user interface is provided on the display.

In some aspects, the electronic processor is further configured to receive, via the user interface, login credentials corresponding to an original equipment manufacturer (OEM) and determine that the OEM has permission to configure a first set of the plurality of configurable device settings and does not have permission to configure a second set of the plurality of configurable device settings. The electronic processor is also configured to allow configuration of the first set of the plurality of configurable device settings by the user and disallow configuration of the second set of the plurality of configurable device settings by the user.

In some aspects, the electronic processor is further configured to enforce one or both of an upper limit and a lower limit for one or more of the first set of the plurality of configurable device settings.

In some aspects, the plurality of configurable device settings include at least one selected from a group consisting of: motor speed, motor control performance, thermal overloads, current limits, and product interfaces.

In some aspects, the electronic processor is further configured to display, via the user interface, the changed device settings, and receive user input, via the user interface, confirming the changed device settings. The changed device settings are transmitted to the gas engine replacement device in response to receiving user input confirming the changed device settings.

Some embodiments provide an adapter system including a gas engine replacement device and an adapter for configuring device settings of the gas engine replacement device. The gas engine replacement device includes a device housing, a battery receptacle coupled to the device housing and configured to removable receive a battery pack, a motor located within the device housing, and a power take-off shaft receiving torque from the motor and protruding from a side of the device housing. The adapter includes a transceiver for communication with the gas engine replacement device, a user interface for displaying information and receiving input from a user, and an electronic processor coupled to the transceiver and the user interface. The electronic processor is configured to connect the adapter to the gas engine replacement device and generate, on the user interface, a graphical user interface showing a plurality of configurable device settings. The electronic processor is also configured to receive user input, via the user interface, to choose one or more device settings to configure and receive user input, via the user interface, to configure the one or more device setting chosen and generate changed device settings. The electronic processor is also configured to transmit the changed device settings to the gas engine replacement device. The gas engine replacement device is then used to drive power equipment in accordance with the changed device settings.

In some aspects, the gas engine replacement device includes a first connection port and the adapter includes a second connection port. The adapter is connected to the gas engine replacement device by plugging one of the first connection port and the second connection port into the other of the first connection port and the second connection port.

In some aspects, the adapter includes a first connection port configured to be connected with a second connection port of the gas engine replacement device.

In some aspects, the adapter includes a housing and a display integrated into the housing. The user interface is provided on the display.

In some aspects, the electronic processor is further configured to receive, via the user interface, login credentials corresponding to an original equipment manufacturer (OEM) and determine that the OEM has permission to configure a first set of the plurality of configurable device settings and does not have permission to configure a second set of the plurality of configurable device settings. The electronic processor is also configured to allow configuration of the first set of the plurality of configurable device settings by the user and disallow configuration of the second set of the plurality of configurable device settings by the user.

In some aspects, the electronic processor is further configured to enforce one or both of an upper limit and a lower limit for one or more of the first set of the plurality of configurable device settings.

In some aspects, the plurality of configurable device settings include at least one selected from a group consisting of: motor speed, motor control performance, thermal overloads, current limits, and product interfaces.

In some aspects, the electronic processor is further configured to display, via the user interface, the changed device settings, and receive user input, via the user interface, confirming the changed device settings. The changed device settings are transmitted to the gas engine replacement device in response to receiving user input confirming the changed device settings.

In some aspects, the adapter and the gas engine replacement device are connected over a wireless connection.

Some embodiments provide a method for configuring device settings of a gas engine replacement device using an adapter. The method includes connecting the adapter to the gas engine replacement device and generating, on a user interface of the adapter, a graphical user interface showing a plurality of configurable device settings. The method also includes receiving user input, via the user interface, to choose one or more device settings to configure and receiving user input, via the user interface, to configure the one or more device settings chosen and generate changed device settings. The method further includes transmitting the changed device settings to the gas engine replacement device and driving, using the gas engine replacement device, power equipment in accordance with the changed device settings.

In some aspects, the method includes receiving, via the user interface, login credentials corresponding to an original equipment manufacturer (OEM) and determining that the OEM has permission to configure a first set of the plurality of configurable device settings and does not have permission to configure a second set of the plurality of configurable device settings. The method also includes allowing configuration of the first set of the plurality of configurable device settings by the user and disallowing configuration of the second set of the plurality of configurable device settings by the user.

In some aspects, the method also includes enforcing one or both of an upper limit and a lower limit for one or more of the first set of the plurality of configurable device settings.

In some aspects, the plurality of configurable device settings include at least one selected from a group consisting of: motor speed, motor control performance, thermal overloads, current limits, and product interfaces.

In some aspects, the method also includes displaying, via the user interface, the changed device settings, and receiving user input, via the user interface, confirming the changed device settings. The changed device settings are transmitted to the gas engine replacement device in response to receiving user input confirming the changed device settings.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in subsets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Other features and aspects will become apparent by consideration of the following detailed description and accompanying drawings.

BRIEF DESCRIPTION OF THE DRAWINGS

FIG. 14A-B illustrate user interfaces displayed on the adapter of FIG. 11 for configuring settings of the gas engine replacement device of FIG. 1 in accordance with some embodiments.

DETAILED DESCRIPTION

Figure 1:
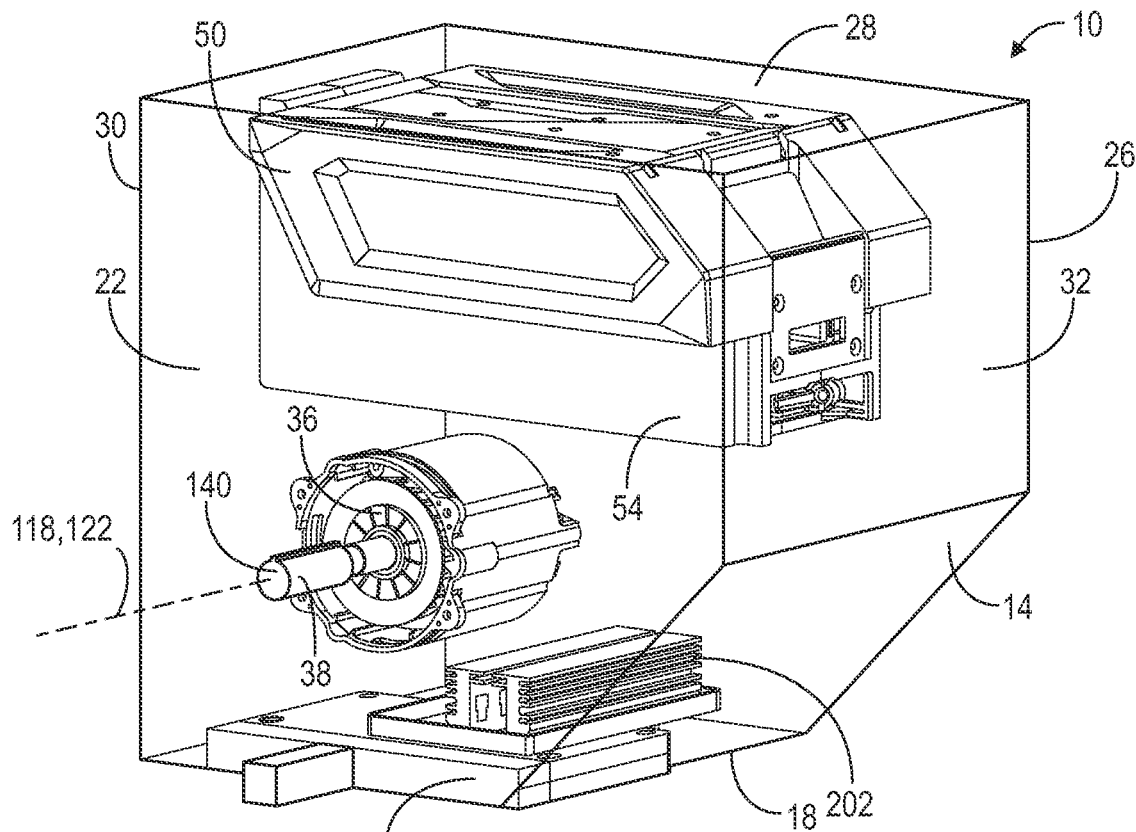
FIG. 1 is a perspective view of a gas engine replacement device in accordance with some embodiments.
Figure 2:
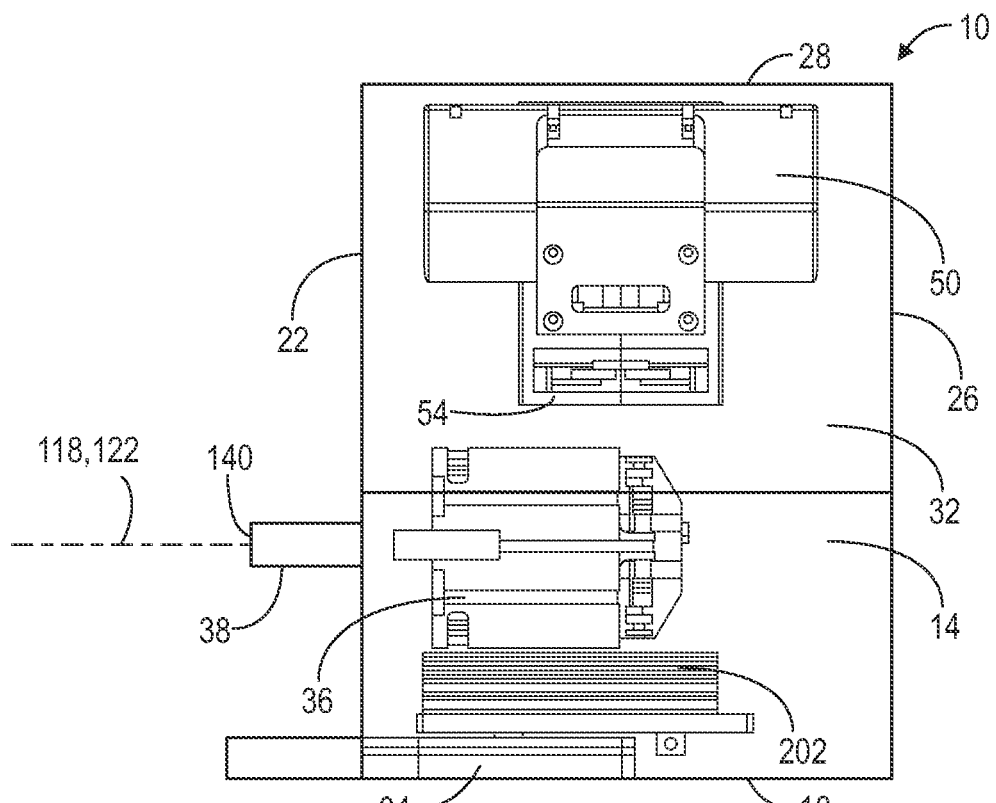
FIG. 2 is a plan view of the gas engine replacement device of FIG. 1 in accordance with some embodiments.
Figure 3:
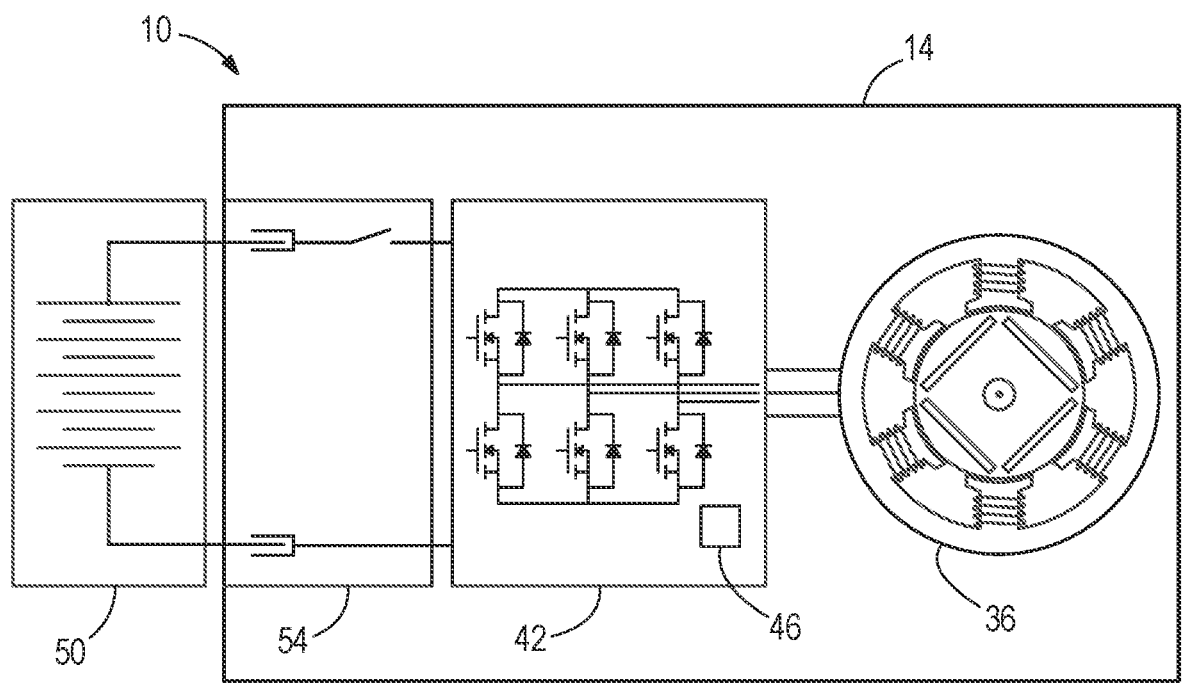
FIG. 3 is a schematic view of the gas engine replacement device of FIG. 1 in accordance with some embodiments.

As shown in FIGS. 1 and 2, a gas engine replacement device 10 for use with a piece of power equipment includes a housing 14 with a first side 18, a second side adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 4:
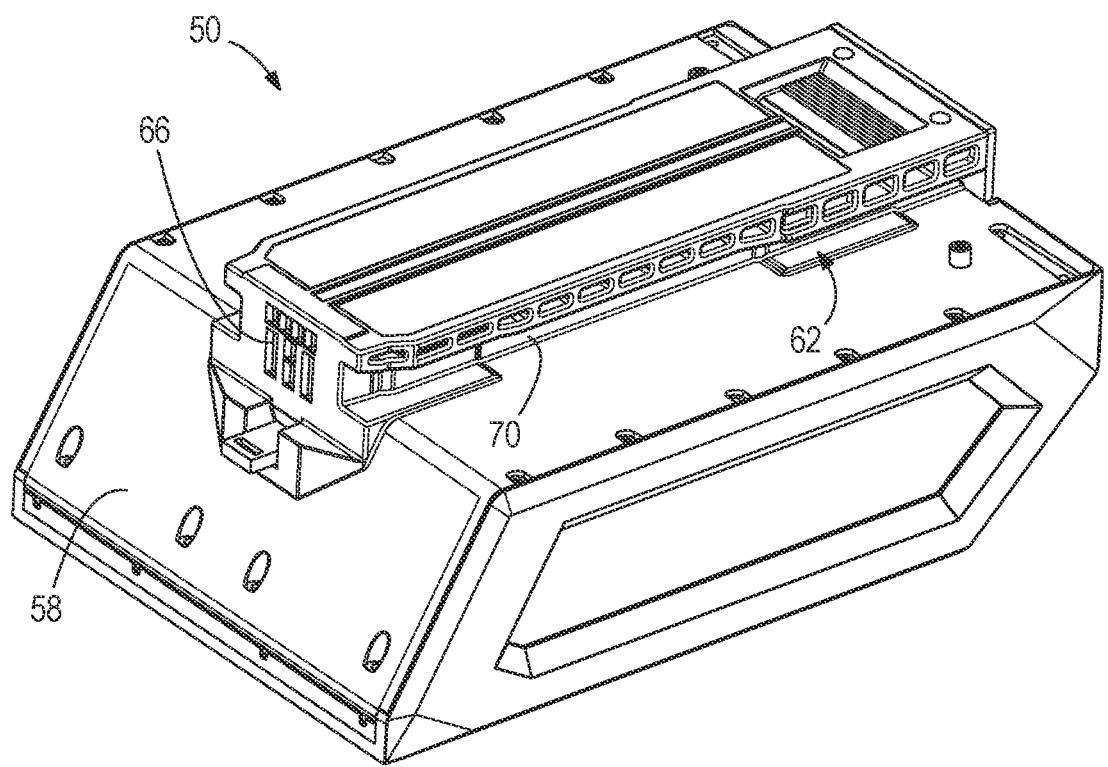
FIG. 4 is a perspective view of a battery pack of the gas engine replacement device of FIG. 1 in accordance with some embodiments.
Figure 5:
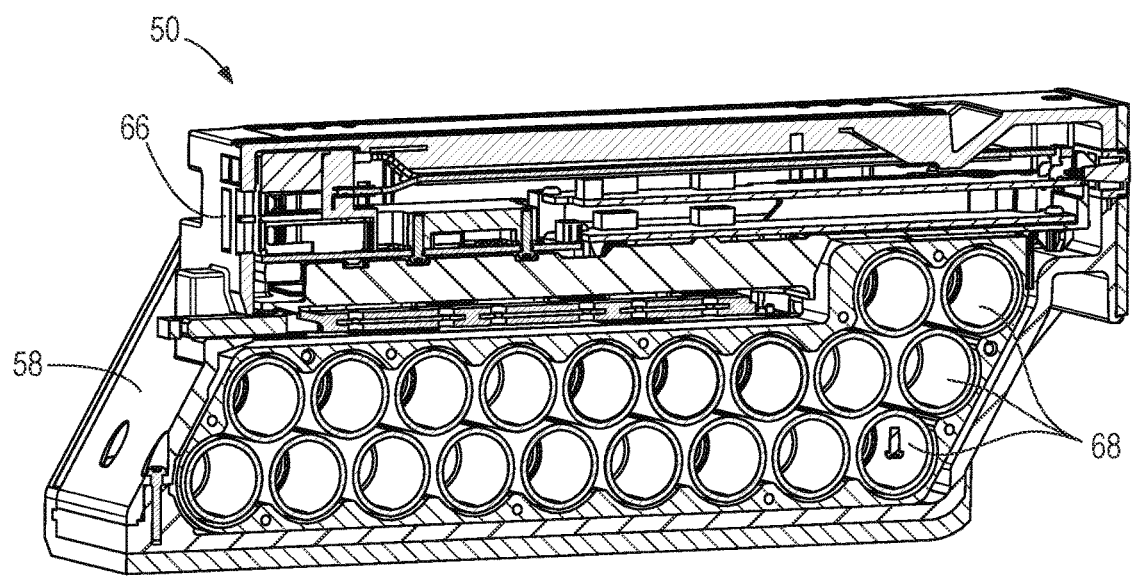
FIG. 5 is a cross-sectional view of the battery pack of FIG. 4 in accordance with some embodiments.
Figure 6:
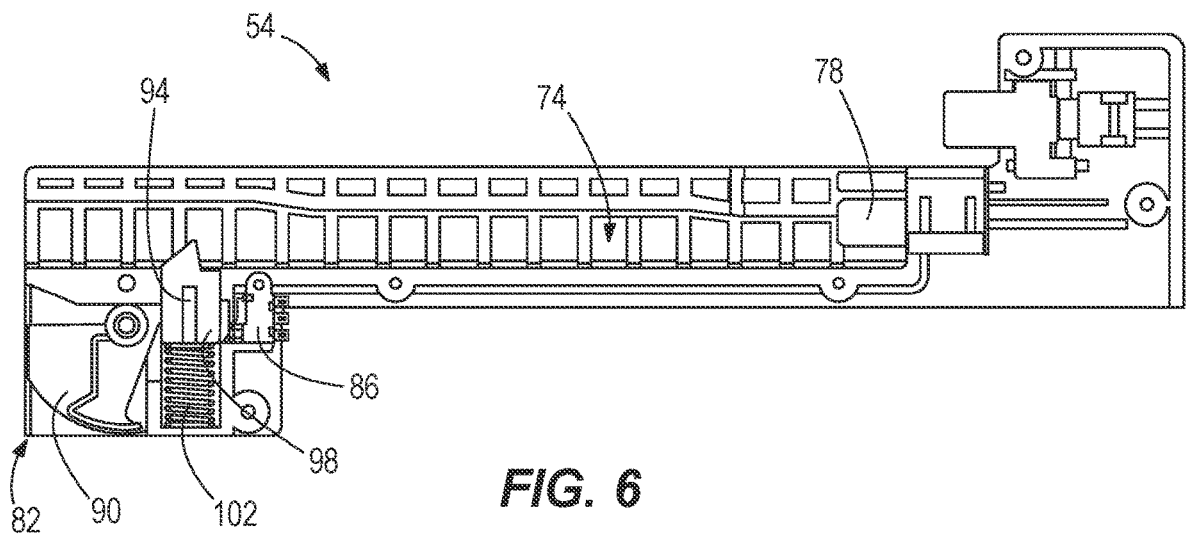
FIG. 6 is a cross-sectional view of a battery receptacle of the gas engine replacement device of FIG. 1 in accordance with some embodiments.

As shown in FIGS. 1-6, the gas engine replacement device 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the battery pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the gas engine replacement device 10 in accordance with some embodiments. The battery receptacle 54 includes the projection/recess portion 74, a second terminal 78, a latching mechanism 82, and a power disconnect switch 86. The projection/recess portion 74 cooperates with the projection/recess portion 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 99 of the battery receptacle 54 and is biased toward a latching position by a biasing member 100 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
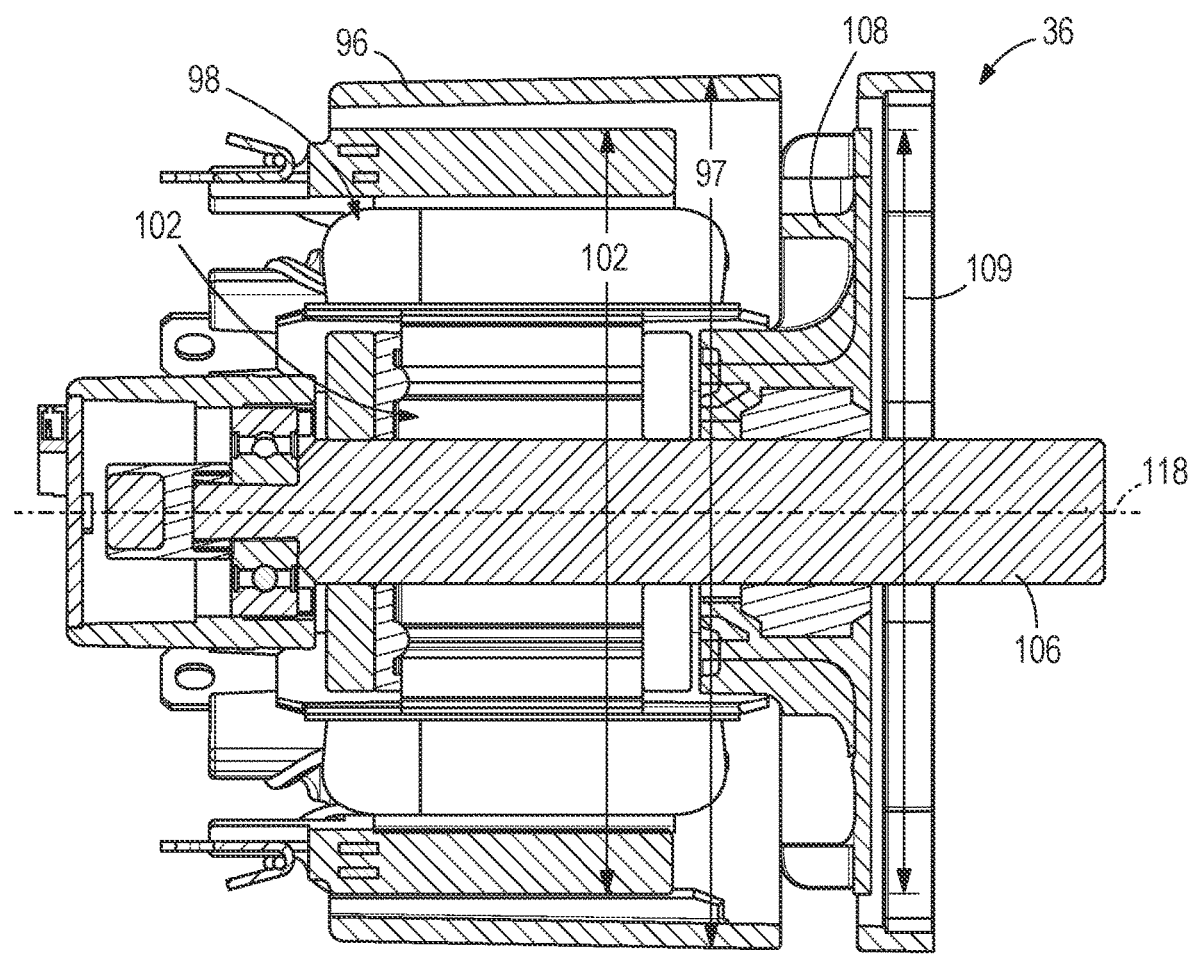
FIG. 7 is a cross-sectional view of a motor of the gas engine replacement device of FIG. 1 in accordance with some embodiments.

As shown in FIG. 7, the motor 36 includes a motor housing 96 having an outer diameter 97, a stator 98 having a nominal outer diameter 101 of up to about 80 mm, a rotor 102 having an output shaft 106 and supported for rotation within the stator 98, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
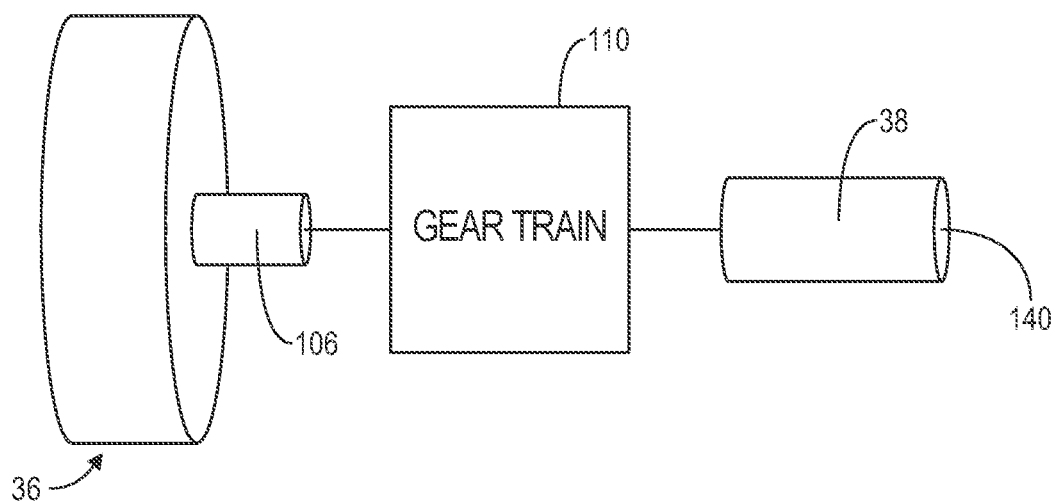
FIG. 8 is a schematic view of a motor, a gear train, and a power take-off shaft of the gas engine replacement device of FIG. 1 in accordance with some embodiments.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 102 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

|  | Metal | Plastic/Rubber/ Wood | Porcelain/Vitreous |
| --- | --- | --- | --- |
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

|  | Metal | Plastic/Rubber |
| --- | --- | --- |
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 9:
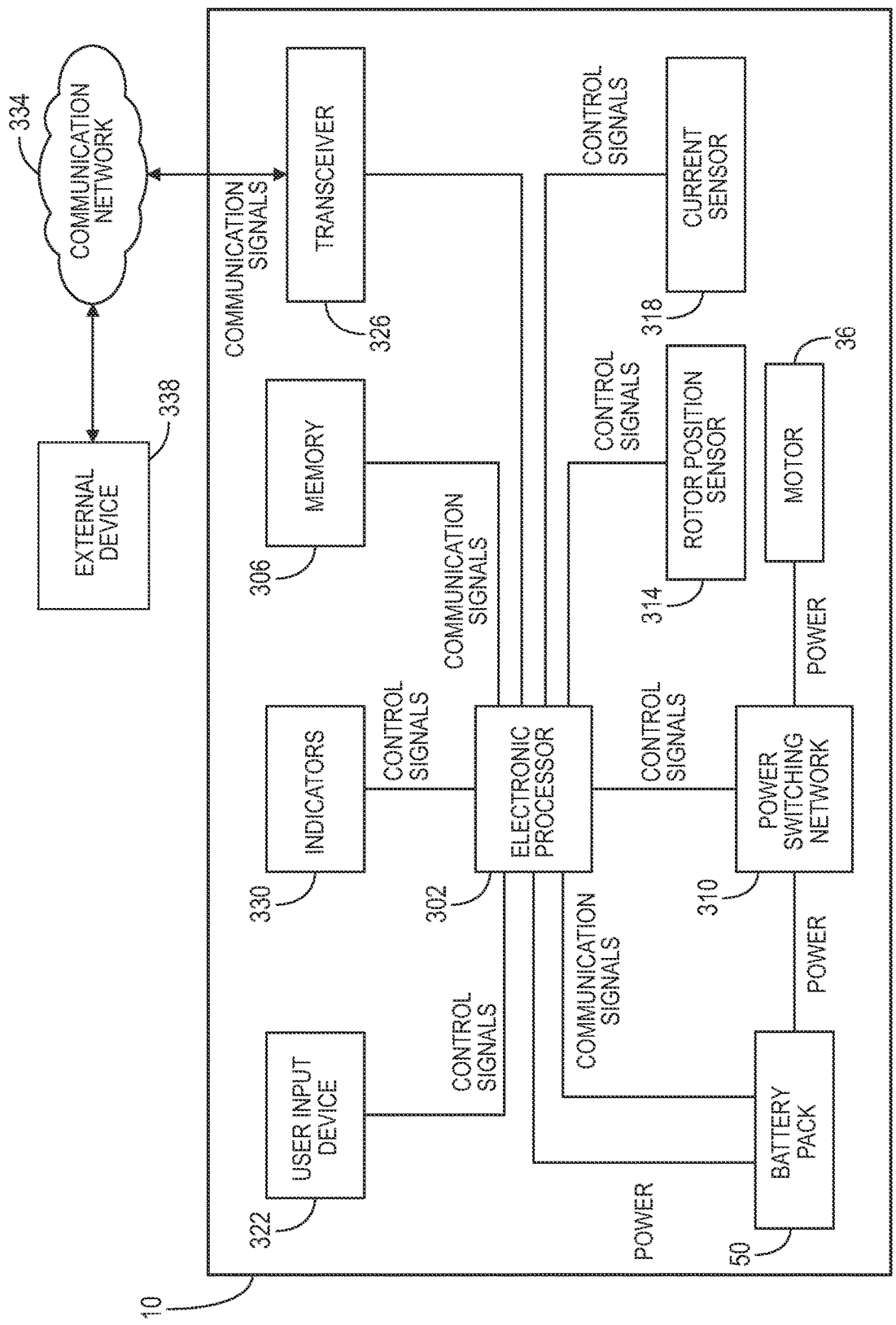
FIG. 9 is a block diagram of the gas engine replacement device of FIG. 1 in accordance with some embodiments.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a trigger or power button), a transceiver 326, and indicators 330 (e.g., light-emitting diodes). In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322 (e.g., a trigger or power button), transceiver 326, and indicators 330 (e.g., light-emitting diodes) form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein. The memory 306 also stores firmware including configurable device settings of the gas engine replacement device 10. The electronic processor 302 accesses the firmware stored in the memory 306 to control the motor 36 according to the device settings in the firmware.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount to which the user input device 322 is depressed is related to or corresponds to a desired speed of rotation of the motor 36. In other embodiments, the amount to which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge (see FIG. 10) that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back-emf) generated in the motor coils. The electronic processor 302 many determine the rotor position, the rotor speed, and the rotor acceleration based on the back-emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils. In some embodiments, the rotor position sensor 314 is optional and not included in the gas engine replacement device 10. In such embodiments, a sensorless motor control technique is employed to determine the position of the rotor, such as trapezoidal sensorless control, field-oriented control ("FOC"), etc.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor 102 of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor 102.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an adapter 410 (see FIGS. 10A-B) or an external device 338 (e.g., a smart phone, tablet, or laptop computer) over a wired or wireless communication network 334. In some embodiments, the transceiver 326 may comprise separate transmitting and receiving components, in some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302.

The communication network 334 provides a wired or wireless connection between the gas engine replacement device 10 and the external device 338. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device 10 are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

As discussed above, gas engine replacement device 10 includes firmware stored in the memory 306. The electronic processor 302 accesses the firmware from the memory 306 and executes the firmware to control the operation of the gas engine replacement device 10. The electronic processor 302 further controls the motor 36 according to the configuration defined by the device settings of the firmware.

Gas engine replacement devices 10 are used to run power equipment that may be produced by a different manufacturer than the gas engine replacement devices 10. The manufacturer of the power equipment, generally referred to as the original equipment manufacturer (OEM) purchases the gas engine replacement devices 10, and provides the gas engine replacement device 10 with the power equipment to the end user.

Firmware may be loaded into the gas engine replacement device 10 before shipping to the OEM. The firmware loaded into the gas engine replacement device 10 may include default device settings configured by the manufacturer of the gas engine replacement device 10. However, different power equipment may have different output configurations based on the application of the power equipment. The default settings may not facilitate optimal operation of the power equipment.

In the example of a concrete mixer application, during normal operation, the motor 36 may be controlled at a dampened control limit as there is generally no or limited variation in the load. However, a higher amount of torque may be required at startup to overcome the initial inertia to start to turn the drum and materials within the drum. In the example of a lawn and garden tractor application, initial inertia is easy to overcome for the motor driving the tractor wheel(s), the blade(s), or both. However, a quicker change in speed/torque may be desired based on the different amounts of load (i.e., length/wetness of grass) encountered by the motor. Under normal operation, the transition to tall and wet grass increases the load demand, which can create a stall condition for a gas engine. Electric motors 36 can respond much faster than a general purpose gas engine and nearly instantaneously provide torque to minimize the loss of speed of cutting blades and, therefore, improve cut quality of grass. Gas engine response is generally slower since the throttle will have to open to allow air to enter the engine. The air flow path will be slower to reach the combustion chamber of the engine as compared to the control strategy of an electric motor 36.

The device settings stored on the memory 306 may be configured to fit desired operation of the power equipment. End users may not have the required amount of knowledge to configure the device settings to fit the desired operation of the power equipment. OEMs however may understand the output requirements desired for optimal operation of the power equipment. Accordingly, there is a need to provide a system for OEMs to configure the device settings of the gas engine replacement device 10.

Figure 10A:
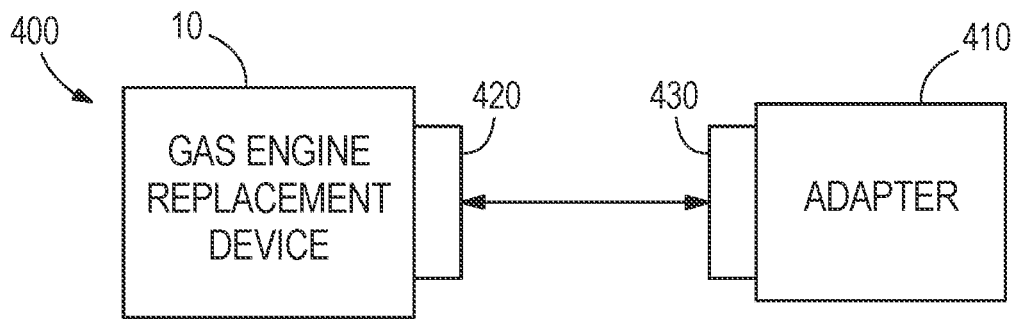
FIG. 10A is a block diagram of an adapter system for the gas engine replacement device of FIG. 1 in accordance with some embodiments.
Figure 10B:
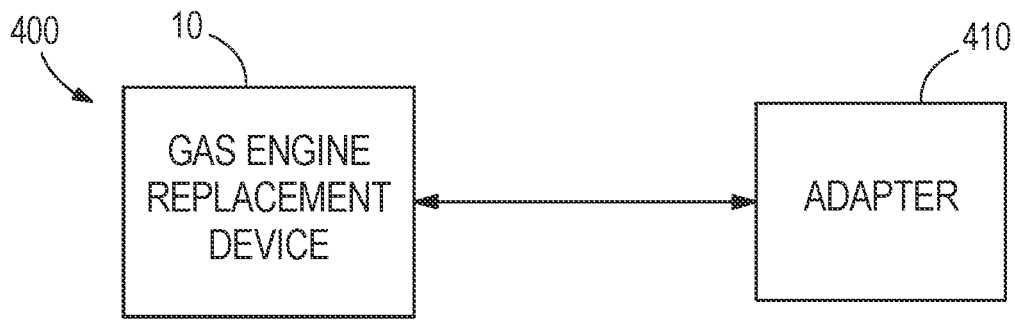
FIG. 10B is another block diagram of an adapter system for the gas engine replacement device of FIG. 1 in accordance with some embodiments.

FIGS. 10A-B illustrate an adapter system 400 to configure the device settings of the gas engine replacement device 10. The adapter system 400 includes the gas engine replacement device 10 and an adapter 410 in communication with the gas engine replacement device 10. As shown in FIG. 10A, the gas engine replacement device 10 includes a first connection port 420 and the adapter 410 includes a second connection port 430. The adapter 410 is connected to the gas engine replacement device 10 by plugging the second connection port 430 into the first connection port 420 or vice versa, or by using a wired cable to connect the ports together. When so connected, the adapter 410 is communicatively coupled to the gas engine replacement device 10 as further described below. The first connection port 420 and the second connection port 430 are, for example, universal serial bus (USB) ports, serial ports, and the like that facilitate data transfer between the adapter 410 and the gas engine replacement device 10. FIG. 10A accordingly illustrates a wired connection between the adapter 410 and the gas engine replacement device 10.

FIG. 10B illustrates a wireless connection between the adapter 410 and the gas engine replacement device 10. In the example illustrated in FIG. 10B, the adapter 410 may communicate with the gas engine replacement device 10 over a suitable wireless communication network, for example. Bluetooth, and the like. The adapter 410 communicates wired or wirelessly with the gas engine replacement device 10 to retrieve and configure the device settings stored in the firmware of the gas engine replacement device 10 as further described below.

Figure 11:
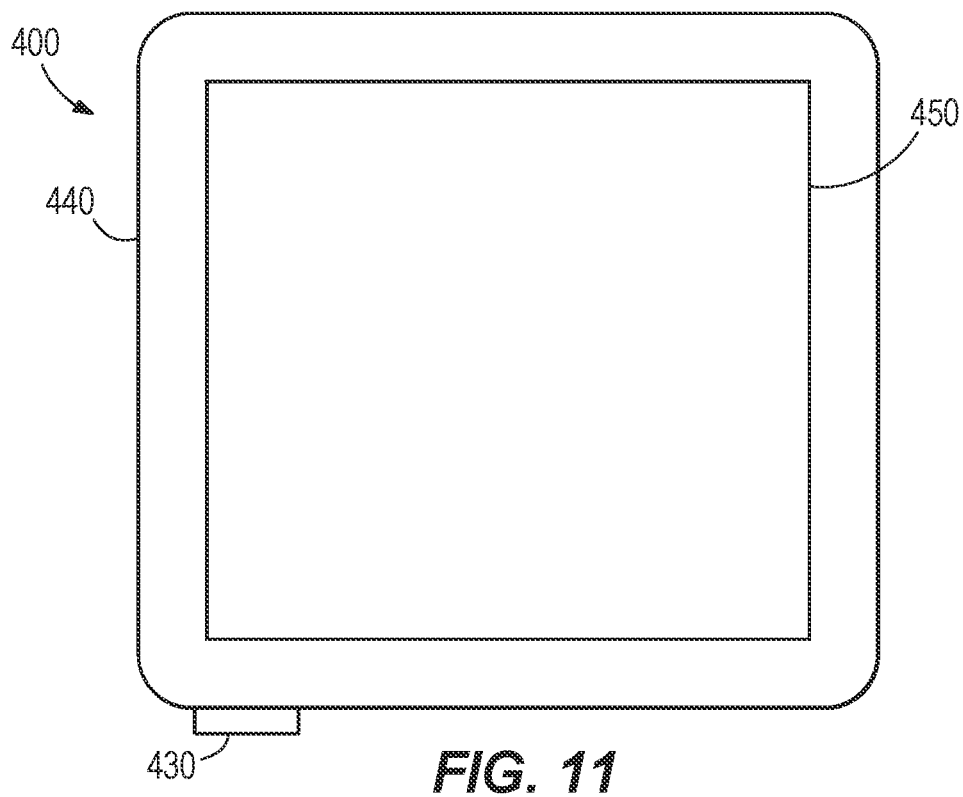
FIG. 11 is a plan view of the adapter illustrated in FIGS. 10A-B in accordance with some embodiments.

FIG. 11 is a plan view of the adapter 410. In some embodiments, the adapter 410 is a specially configured device that is configured to operate in conjunction with the gas engine replacement device 10. In other embodiments, the adapter 410 is an adapter application loaded onto a laptop computer, a tablet computer, smart telephone, and the like. In the example illustrated, the adapter 410 includes a housing 440, the second connection port 430 provided on the housing 440, and a display 450 integrated into the housing 440. The display 450 is, for example, a touchscreen display 450 that displays information received from the gas engine replacement device 10 to the user using a graphical user interface. The display 450 may also receive input from the user directly through the display 450 to change one or more of the parameters listed on the display 450 (e.g., modifiable device settings of the firmware retrieved from the gas engine replacement device 10). In some embodiments, the display 450 includes a separate display component and a separate input component (e.g., an attached keyboard), or both a touch screen display and a separate input component.

Figure 12:
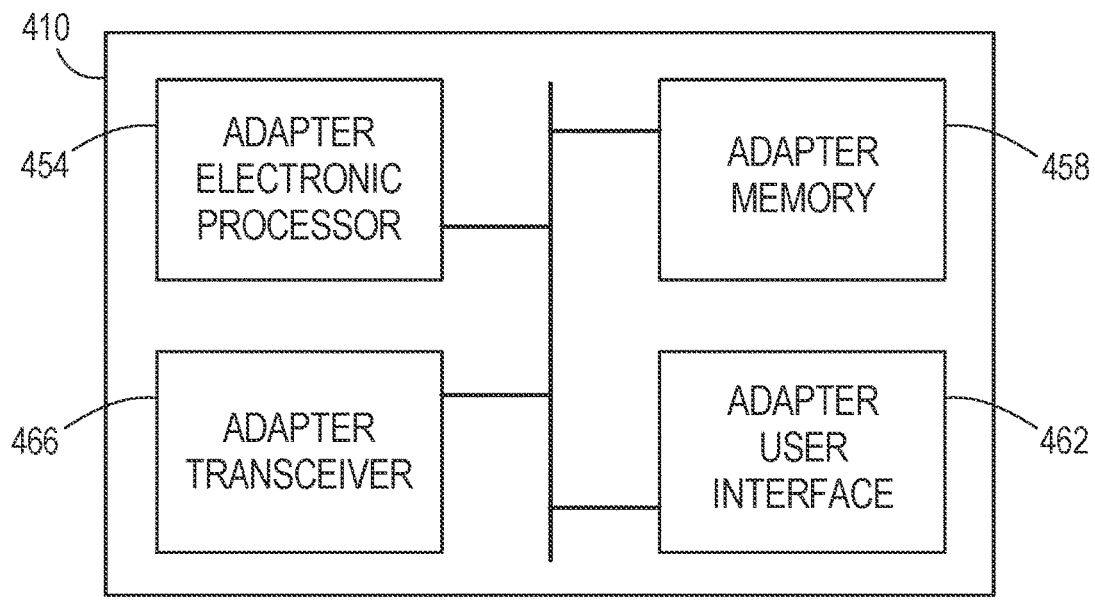
FIG. 12 is a block diagram of the adapter of FIG. 11 in accordance with some embodiments.

FIG. 12 illustrates a simplified block diagram of the adapter 410 according to one example embodiment. As shown in FIG. 12, the adapter 410 includes an adapter electronic processor 454, an adapter memory 458, an adapter user interface 462, and an adapter transceiver 466. In some embodiments, the adapter 410 includes fewer or additional components than those shown in FIG. 12. The adapter electronic processor 454, the adapter memory 458, and the adapter transceiver 466 may be implemented similar to the electronic processor 302, the memory 306, and the transceiver 326 of the gas engine replacement device 10. The adapter transceiver 466 allows the adapter 410 to communicate over a wired or wireless communication network 334 with the gas engine replacement device 10. Particularly, a user of the adapter 410 can configure the device settings stored in the firmware of the gas engine replacement device 10 using the adapter 410.

Figure 13:
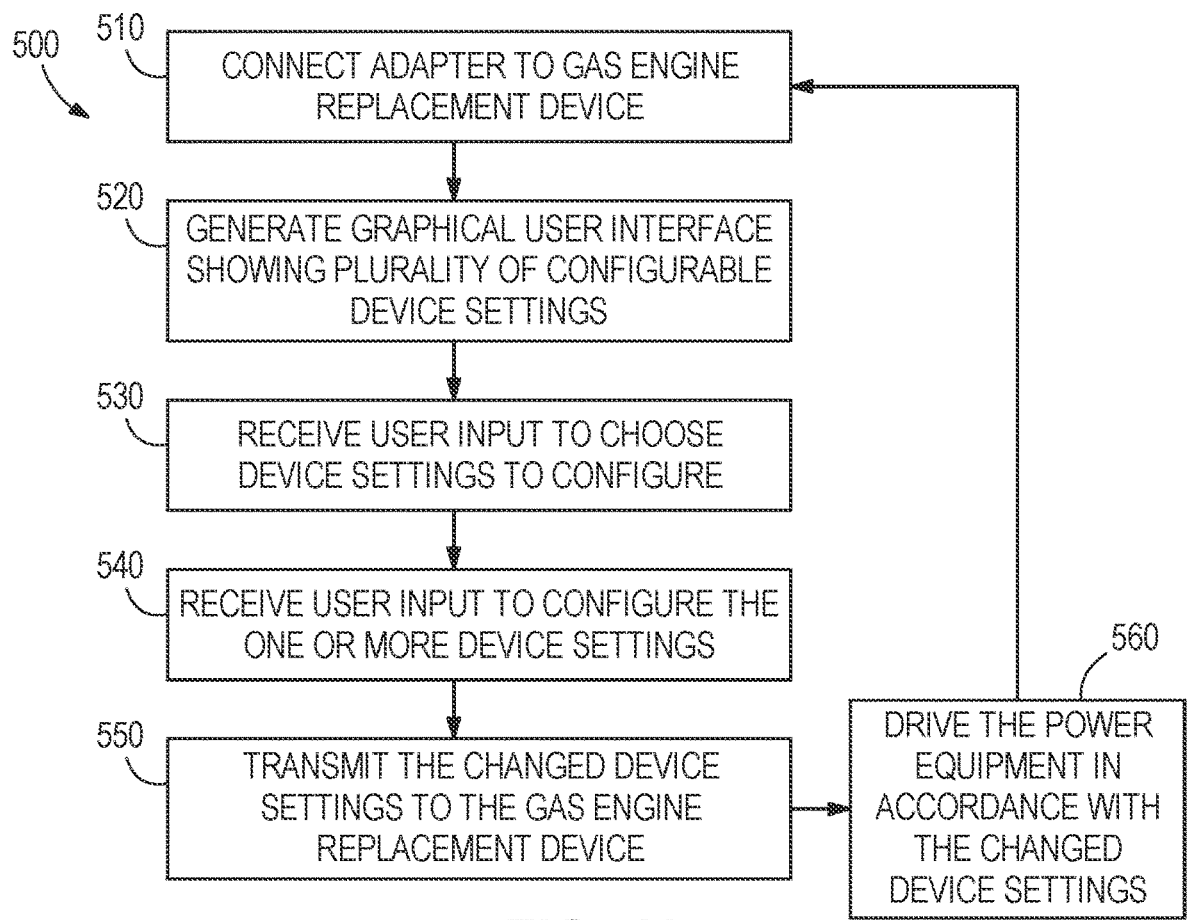
FIG. 13 is a flowchart of a method for configuring settings of the gas engine replacement device of FIG. 1 using the adapter of FIG. 11 in accordance with some embodiments.

FIG. 13 is a flowchart of an example method 500 for configuring device settings of the gas engine replacement device 10 using the adapter 410. In the example illustrated, the method 500 includes connecting the adapter 410 to the gas engine replacement device 10 (at block 510). The adapter 410 may be connected to the gas engine replacement device 10 using a wired connection. For example, a USB cable may be used to connect the first connection port 420 and the second connection port 430 to connect the adapter 410 and the gas engine replacement device 10. After detecting that the adapter 410 is connected to the gas engine replacement device 10, the adapter electronic processor 454 establishes or initializes a communication protocol to exchange information with the gas engine replacement device 10, in some embodiments, the adapter 410 may be connected to the gas engine replacement device 10 using a wireless connection. For example, the adapter 410 may be paired to the gas engine replacement device 10 and subsequently connected using a Bluetooth connection.

The method 500 also includes generating a graphical user interface showing a plurality of configurable device settings (at block 520). For example, once connected, the adapter 410 retrieves the current device settings of the gas engine replacement device 10 and generates a graphical user interface on the display 450 including the retrieved current device settings. As an example, FIG. 14A illustrates a graphical user interface 600 including a plurality of configurable device settings for the gas engine replacement device 10 and the associated current value of each of the plurality of configurable device settings. Prior to generating the graphical user interface 600 or connecting to the gas engine replacement device 10, the adapter 410 may prompt a user to enter login credentials. The login credentials may be unique to each OEM. In response to receiving the correct login credentials, the adapter electronic processor 454 may communicate with the electronic processor 302 via the adapter transceiver 466 and the transceiver 326 to retrieve the present device settings of the gas engine replacement device 10. The adapter electronic processor 454 causes the adapter user interface 462 to display the graphical user interface 600 showing the present device settings on the display 450. In some embodiments, the electronic processor 302 may provide only the device settings to the adapter electronic processor 454 that are permitted to be configured by the OEM. The particular OEM is identified based on the login credentials. The electronic processor 302 then determines the device settings that are permitted to be configured by the OEM and provides the permitted device settings to the adapter electronic processor 454. In one example, the electronic processor 302 provides a first plurality of device settings to an adapter 410 of a first OEM and provides a second plurality of device settings at least partially different from the first plurality of device settings to an adapter 410 of a second OEM. Specifically, the electronic processor 454 allows configuration of a first set of the plurality of configurable device settings by the user and disallows configuration of a second set of the plurality of configurable device settings by the user.

In some embodiments, the adapter 410 transmits the login credentials to a server to obtain permission data, which may include a listing of device settings that are permitted to be configured by the OEM or a password indicating a particular permissions level of the OEM. The adapter 410 may communicate the password to the gas engine replacement device 10, which may then associate the adapter 410 (and, thus, the OEM) with a set of device settings that the OEM is permitted to configure. In one example, the electronic processor 302 provides a first plurality of device settings to an adapter 410 of a first OEM that communicates a first password, and provides a second plurality of device settings at least partially different from the first plurality of device settings to an adapter 410 of a second OEM that communicates a second password to the gas engine replacement device 10. The communication between the adapter 410 and the server may occur via the adapter transceiver 466 and a wide area network (e.g., the Internet), a cellular network, or network types, or a combination thereof.

The method 500 includes receiving user input to choose one or more device settings to configure (at block 530). The user may provide input through the display 450, or other input device as described above, to select the one or more device settings that are desired to be changed. Example device settings that may be adjusted include motor speed, motor control performance, thermal overloads, current limits, product interfaces etc. Motor control parameters can also be adjusted to tune overshoot, undershoot, and steady state control. The graphical user interface 600 of FIG. 14A also illustrates example device settings that may be selected by user input at block 530.

The method 500 includes receiving user input to configure the one or more device settings chosen (at block 540). For example, the user may configure (e.g., increase, decrease, or otherwise modify) the value of the parameter of the chosen device setting to arrive at desired device settings. The user may provide input through the display 450, or other input device as described above, to configure the one or more device settings that are desired to be changed. For example, after selecting one of the device settings illustrated on the graphical user interface 600 of FIG. 14A to be configured (in the previous block 530), a soft keyboard, arrow keys, drop down lists, or other graphical user interface input elements may be generated on the graphical user interface 600 to enable a user to input new values for the selected device setting. After the user input is received to configure the one or more device settings, the graphical user interface may be updated to show the new desired values for the one or more device settings. For example. FIG. 14B illustrates a graphical user interface 610 showing the changed device settings configured by the OEM. The one or more device settings with modified values, either separately or collectively with the unchanged device settings, may be referred to as the changed device settings.

In some embodiments, the adapter 410 may restrict adjustment between an upper and lower limit for each device setting, or otherwise may restrict adjustment to a subset of available configurations for a particular device setting. The upper and lower limit may be stored in the memory 458 and may be unique to each OEM to prevent modifications that are incompatible with the power equipment connected to the gas engine replacement device 10.

The method 500 further includes transmitting the changed device settings to the gas engine replacement device 10 (at block 550). For example, when the configuration is finalized (e.g., in response to a selection of a "save" key or similar interface element on the graphical user interface of the adapter 410), the adapter electronic processor 454 provides, via the adapter transceiver 466, the changed device settings shown in the graphical user interface 610 to the electronic processor 302 of the gas engine replacement device 10. Specifically, the electronic processor 454 displays the changed device settings and receives user input confirming the changed device settings.

In some embodiments, upon receipt of the changed device settings, the electronic processor 302 stores the changed device settings in the memory 306, thereby replacing or updating the previously stored device settings. In some embodiments, the electronic processor 302 performs a verification of the changed device settings to ensure that the changed device settings are compatible with the power equipment(s) of the OEM. For example, the electronic processor 302 may restrict adjustment between an upper and lower limit for each device setting, or otherwise may restrict adjustment to a subset of available configurations for a particular device setting. The upper and lower limit may be stored in the memory 306 and may be unique to each OEM. When one or more of the changed device settings received are outside of the permitted values for an associated device setting, the electronic processor 302 may reject the changed device settings and provide an indication to the adapter 410 that the changed device settings are not compatible with the power equipment. When the changed device settings received are within the permitted values for an associated device setting, the electronic processor 302 stores the changed device settings in the memory 306 to be used with the power equipment.

The gas engine replacement device 10 is then used to drive the power equipment in accordance with the changed device settings (block 560). For example, the gas engine replacement device 10, either before or after block 550, is installed on or connected to the power equipment of the OEM. Thereafter, in block 560, the electronic processor 302 drives the gas engine replacement device 10 in accordance with the changed device settings stored in the memory 306. Driving the gas engine replacement device 10 in accordance with the changed device settings includes, for example, driving the motor according to the defined maximum and minimum speed settings and the speed control algorithms. In another example, driving the gas engine replacement device 10 in accordance with the changed device settings includes enforcing the defined overcurrent, overvoltage, and overtemperature limits. Additional examples of device settings are provided below.

In some embodiments, the device settings that can be changed by the OEM include speed control algorithms. These speed control algorithms may include speed increase and/or speed decrease profile that defines the rate at which the speed is increased or decreased. The speed control algorithms may also define whether the speed is changed continuously or in a step-wise manner. The OEM may also change device settings directed to motor speed. For example, the OEM may set a minimum speed setting and maximum speed setting during operation of the gas engine replacement device 10. The minimum speed setting defines the minimum speed at which the gas engine replacement device 10 controls the motor 36 when driving the power equipment. The maximum speed setting defines the maximum speed at which the gas engine replacement device 10 controls the motor 36 when driving the power equipment. A speed limit threshold may also be configured by the OEM to limit the speed of the motor 36 when driving the power equipment. In some embodiments, the OEM may also change the coefficients of the PID controller used to control the motor 36. The OEM may alter, using the method 500, the proportional coefficient, the integral coefficient, and the differential coefficient of the PID controller. The gas engine replacement device 10 provides the changed coefficients to the PID controller, which adjusts to operate according to the changed coefficients.

In some embodiments, the OEM may change the overcurrent, overvoltage, and or over-temperature limits of the gas engine replacement device. These settings may include a threshold limit, a threshold time period, and a hysteresis limit. As illustrated in FIGS. 14A-B, the user may define the overcurrent conditions as including a maximum current threshold and a time limit such that the gas engine replacement device 10 controls the motor 36 to turn off or reduce the speed when the motor current exceeds the maximum current threshold for the time limit. In the example, the gas engine replacement device 10 restricts motor 36 operation when the motor current exceeds 75 A for at least 0.01 seconds. The OEM my also define the hysteresis between a restriction condition and operation condition. In the example illustrated in FIG. 14B, the gas engine replacement device restricts the motor 36 when the current exceeds 75 A for the time limit, but does not resume normal operation of the motor 36 until the motor current is below 68 A (that is, 75 A–7 A, which is the Hysteresis). In addition, to the above, the OEM may also use the adapter 410 to enable and disable certain auxiliary inputs and outputs of the gas engine replacement device 10. The above device settings are typically not available for an OEM or end user to be changed in other devices. The adapter 410 allows OEMs to have additional flexibility in changing these settings to obtain optimal performance of the OEM's power equipment.

The adapter 410 thereby provides a way for OEMs to configure the gas engine replacement device 10 to deliver optimal or desired performance of the power equipment. Gas engine replacement applications may vary from outdoor power equipment to construction equipment to currently unknown applications. The flexibility for OEMs to configure the operation of the gas engine replacement device 10 allows the OEMs to reach improved performance for their application. In current gas engine usage, product OEMs are forced to compromise since there is no control strategy tuning capability. Gas engines are either tuned for limited applications or users must implement additional hardware adding to the cost and form factor of the gas engines. The adapter 410 provides a configuration tool the OEMs can use to program the device settings of the gas engine replacement device 10 without adding to the cost and form factor.

Thus, embodiments described herein provide, among other things, an adapter for configuring a gas engine replacement device.

What is claimed is:

1. An adapter for configuring device settings of a gas engine replacement device, the adapter comprising:
   a transceiver for communication with the gas engine replacement device;
   a user interface for displaying information and receiving input from a user; and
   an electronic processor coupled to the transceiver and the user interface, the electronic processor is configured to:
      connect the adapter to the gas engine replacement device,
      generate, on the user interface, a graphical user interface showing a plurality of configurable device settings for the gas engine replacement device,
      receive a first user input, via the user interface, to select one or more configurable device setting to configure,
      receive a second user input, via the user interface, to configure the selected one or more configurable device settings,
      generate changed device settings for the gas engine replacement device, and
      transmit the changed device settings to the gas engine replacement device,
   wherein the gas engine replacement device is used to drive power equipment in accordance with the changed device settings.

2. The adapter of claim 1, further comprising a first connection port configured to be connected with a second connection port of the gas engine replacement device.

3. The adapter of claim 1, further comprising:
   a housing; and
   a display integrated into the housing, wherein the user interface is provided on the display.

4. The adapter of claim 1, wherein the electronic processor is further configured to:
   receive, via the user interface, login credentials corresponding to an original equipment manufacturer (OEM);
   determine that the OEM has permission to configure a first set of the plurality of configurable device settings and does not have permission to configure a second set of the plurality of configurable device settings;

allow configuration of the first set of the plurality of configurable device settings by the user; and disallow configuration of the second set of the plurality of configurable device settings by the user.

5. The adapter of claim 4, wherein the electronic processor is further configured to:

enforce one or both of an upper limit and a lower limit for one or more of the first set of the plurality of configurable device settings.

6. The adapter of claim 1, wherein the plurality of configurable device settings include at least one selected from a group consisting of: motor speed, motor control performance, thermal overloads, current limits, and product interfaces.

7. The adapter of claim 1, wherein the electronic processor is further configured to:

display, via the user interface, the changed device settings; and receive a third user input, via the user interface, confirming the changed device settings, wherein the changed device settings are transmitted to the gas engine replacement device in response to receiving user input confirming the changed device settings.

8. An adapter system comprising:

a gas engine replacement device including:
a device housing,
a battery receptacle coupled to the device housing and configured to removable receive a battery pack,
a motor located within the device housing, and
a power take-off shaft receiving torque from the motor and protruding from a side of the device housing; and an adapter for configuring device settings of the gas engine replacement device, the adapter including:
a transceiver for communication with the gas engine replacement device,
a user interface for displaying information and receiving input from a user, and
an electronic processor coupled to the transceiver and the user interface, the electronic processor is configured to:
connect the adapter to the gas engine replacement device,
generate, on the user interface, a graphical user interface showing a plurality of configurable device settings for the gas engine replacement device,
receive a first user input, via the user interface, to select one or more configurable device setting to configure,
receive a second user input, via the user interface, to configure the selected one or more configurable device settings,
generate changed device settings for the gas engine replacement device, and
transmit the changed device settings to the gas engine replacement device,
wherein the gas engine replacement device is used to drive power equipment in accordance with the changed device settings.

9. The adapter system of claim 8, wherein:
the gas engine replacement device includes a first connection port;
the adapter includes a second connection port; and
the adapter is connected to the gas engine replacement device by plugging one of the first connection port and the second connection port into the other of the first connection port and the second connection port.

10. The adapter system of claim 8, wherein the adapter further comprises:
an adapter housing; and
a display integrated into the adapter housing, wherein the user interface is provided on the display.

11. The adapter system of claim 8, wherein the electronic processor is further configured to:
receive, via the user interface, login credentials corresponding to an original equipment manufacturer (OEM);
determine that the OEM has permission to configure a first set of the plurality of configurable device settings and does not have permission to configure a second set of the plurality of configurable device settings;
allow configuration of the first set of the plurality of configurable device settings by the user; and
disallow configuration of the second set of the plurality of configurable device settings by the user.

12. The adapter system of claim 11, wherein the electronic processor is further configured to enforce one or both of an upper limit and a lower limit for one or more of the first set of the plurality of configurable device settings.

13. The adapter system of claim 8, wherein the plurality of configurable device settings include at least one selected from a group consisting of: motor speed, motor control performance, thermal overloads, current limits, and product interfaces.

14. The adapter system of claim 8, wherein the electronic processor is further configured to:
display, via the user interface, the changed device settings; and
receive a third user input, via the user interface, confirming the changed device settings,
wherein the changed device settings are transmitted to the gas engine replacement device in response to receiving user input confirming the changed device settings.

15. The adapter system of claim 8, wherein the adapter and the gas engine replacement device are connected over a wireless connection.

16. A method for configuring device settings of a gas engine replacement device using an adapter, the method comprising:
connecting the adapter to the gas engine replacement device;
generating, on a user interface of the adapter, a graphical user interface showing a plurality of configurable device settings for the gas engine replacement device;
receiving a first user input, via the user interface, to choose one or more device settings to configure;
receiving a second user input, via the user interface, to configure the one or more device settings chosen;
generating changed device settings;
transmitting the changed device settings to the gas engine replacement device; and
driving, using the gas engine replacement device, power equipment in accordance with the changed device settings.

17. The method of claim 16, further comprising:
receiving, via the user interface, login credentials corresponding to an original equipment manufacturer (OEM);
determining that the OEM has permission to configure a first set of the plurality of configurable device settings and does not have permission to configure a second set of the plurality of configurable device settings;

allowing configuration of the first set of the plurality of configurable device settings by a user; and disallowing configuration of the second set of the plurality of configurable device settings by the user.

18. The method of claim 17, further comprising enforcing one or both of an upper limit and a lower limit for one or more of the first set of the plurality of configurable device settings.

19. The method of claim 18, wherein the plurality of configurable device settings include at least one selected from a group consisting of: motor speed, motor control performance, thermal overloads, current limits, and product interfaces.

20. The method of claim 16, further comprising:

displaying, via the user interface, the changed device settings; and receiving user input, via the user interface, confirming the changed device settings, wherein the changed device settings are transmitted to the gas engine replacement device in response to receiving user input confirming the changed device settings.

\* \* \* \* \*